(12) United States Patent
Cammack

(10) Patent No.: US 8,317,163 B1
(45) Date of Patent: Nov. 27, 2012

(54) SWING GATE BRACKET HINGE

(76) Inventor: Malcolm Cammack, Hugo, MN (US)

( * ) Notice: Subject to any disclaimer, the term of this patent is extended or adjusted under 35 U.S.C. 154(b) by 218 days.

(21) Appl. No.: 12/482,485

(22) Filed: Jun. 11, 2009

Related U.S. Application Data

(60) Provisional application No. 61/076,721, filed on Jun. 30, 2008.

(51) Int. Cl.
*B21F 27/00* (2006.01)

(52) U.S. Cl. ............. 256/32; 256/36; 248/201; 16/86.1; 49/29; 49/381

(58) Field of Classification Search .................. 248/201, 248/219.1, 219.2; 16/86.1, 86.2, 221, 254, 16/268, 387, 389, 253, 252; 49/293, 294, 49/301, 289, 394, 58, 381; 256/36, 65, 73, 256/67, 68, 59, 32, 35, 2, 6, 30, 31, 63, 64, 256/34
See application file for complete search history.

(56) References Cited

U.S. PATENT DOCUMENTS

| | | | | |
|---|---|---|---|---|
| 253,828 A | * | 2/1882 | Alexander | 16/86.2 |
| 772,996 A | * | 10/1904 | Allsup | 256/73 |
| 1,069,345 A | * | 8/1913 | Miller | 52/456 |
| 1,095,938 A | * | 5/1914 | Somers | 49/294 |
| 1,429,389 A | * | 9/1922 | Weintz | 292/216 |
| 2,540,784 A | * | 2/1951 | Hocher | 248/219.1 |
| 2,608,369 A | * | 8/1952 | Hocher | 248/201 |
| 2,651,806 A | * | 9/1953 | Thompson | 16/253 |
| 2,659,168 A | * | 11/1953 | Kaplan | 49/381 |
| 2,696,357 A | * | 12/1954 | Elmer | 248/201 |
| 2,763,890 A | | 9/1956 | Cox | |
| 2,803,899 A | * | 8/1957 | Denovan | 160/328 |
| 3,295,158 A | * | 1/1967 | Hotchkiss, Jr. et al. | 16/252 |
| 3,408,028 A | * | 10/1968 | Raymond | 248/219.3 |
| 4,729,149 A | * | 3/1988 | Brunkan | 16/252 |
| 5,020,190 A | * | 6/1991 | Muegerl | 16/380 |
| 5,167,049 A | * | 12/1992 | Gibbs | 16/253 |
| 5,593,141 A | * | 1/1997 | Cain et al. | 256/26 |
| 7,588,222 B1 | * | 9/2009 | Feldberg | 248/218.4 |

OTHER PUBLICATIONS http://www.Freudenthal.com.

* cited by examiner

*Primary Examiner* — Kimberly Wood
(74) *Attorney, Agent, or Firm* — Elizabeth D. Lewen; Sherrill Law Offices, PLLC

(57) ABSTRACT

A pipe gate hinge comprises a substantially U-shaped bracket, at least one pipe attachment member, and at least two post attachment members. The bracket has a first longitudinally extending leg with the distal end portion angled in the first transverse direction relative to a longitudinal axis and a second longitudinally extending leg with the distal end portion angled in the second transverse direction relative to the longitudinal axis. At least one pipe attachment aperture is in the first leg and one pipe attachment aperture is in the second leg. At least one post attachment aperture is proximate the distal end portion of the first leg and at least one post attachment aperture is proximate the distal end portion of the second leg. At least one pipe attachment member is configured and arranged to be inserted through the pipe attachment apertures to secure the bracket to a vertically extending member of a pipe gate. At least two post attachment members are configured and arranged to be inserted through the post attachment apertures to secure the bracket to a vertical surface.

5 Claims, 9 Drawing Sheets

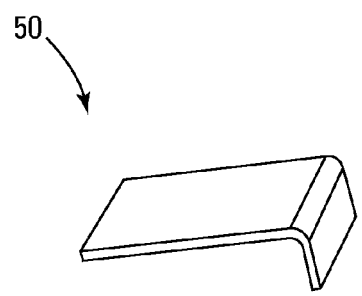
Fig. 4
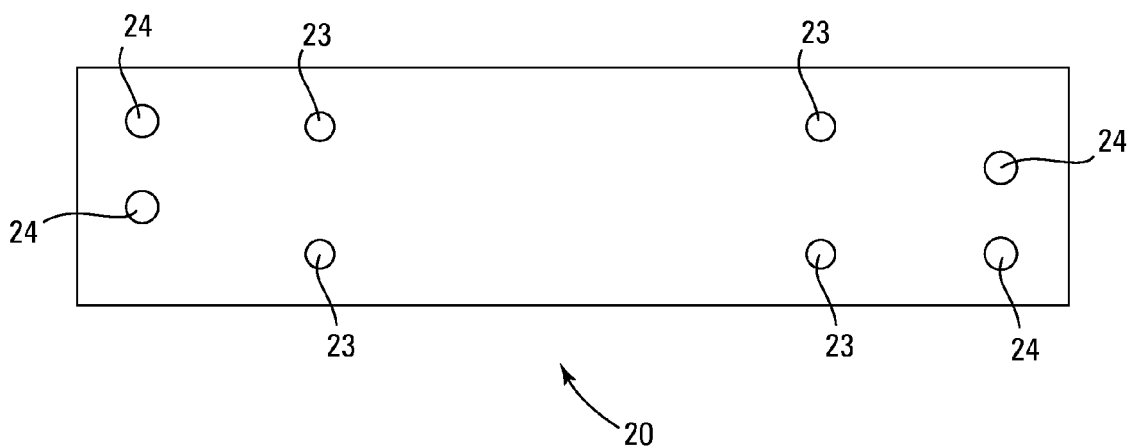
Fig. 5
Y

US 8,317,163 B1

SWING GATE BRACKET HINGE

This application claims the benefit of U.S. Provisional Application No. 61/076,721, filed Jun. 30, 2008.

BACKGROUND

Pipe gates are a popular gate option on farms. The pipe gate is often pivotally connected to a fence post to allow opening and shutting of the gate. A common pivot connection is a pintle/gudgeon hinge. The gudgeon is clamped to the gate and the pintle is a screw or bolt that goes into a post. Hinges are usually attached to a gate after the gate is constructed and could be removed from the gate.

Many pipe gates are quite long. Because of their length they tend to exert a large force on the hinge. Most hinges when subject to this force alter their desired fixed relation to the gate to which they are attached. With a pintle/gudgeon hinge, the gudgeon rotates on the gate and/or the pintle rotates in the post when subject to this force. The result is that over time the end of the gate may sag toward the ground.

Therefore, a need exists for a pipe gate hinge that provides greater structural strength at the pivot point and is not subject to alteration of the relationship between the gate and the hinge to reduce sagging of the gate over time.

SUMMARY OF THE INVENTION

A first embodiment of the invention is a pipe gate hinge comprising a substantially U-shaped bracket, at least one pipe attachment member, and at least two post attachment members. The bracket has a first longitudinally extending leg with the distal end portion angled in the first transverse direction relative to a longitudinal axis and a second longitudinally extending leg with the distal end portion angled in the second transverse direction relative to the longitudinal axis. At least one pipe attachment aperture is in the first leg and one pipe attachment aperture is in the second leg. At least one post attachment aperture is proximate the distal end portion of the first leg and at least one post attachment aperture is proximate the distal end portion of the second leg. At least one pipe attachment member is configured and arranged to be inserted through the pipe attachment apertures to secure the bracket to a vertically extending member of a pipe gate. At least two post attachment members are configured and arranged to be inserted through the post attachment apertures to secure the bracket to a vertical surface.

A second embodiment of the invention is a method of hingedly securing a pipe gate to a vertical post. A first pipe gate hinge is obtained. The first pipe gate hinge comprises a substantially U-shaped bracket, at least one pipe attachment member, and at least two post attachment members. The bracket has a first longitudinally extending leg with the distal end portion angled in the first transverse direction relative to a longitudinal axis and a second longitudinally extending leg with the distal end portion angled in the second transverse direction relative to the longitudinal axis. At least one pipe attachment aperture is in the first leg and one pipe attachment aperture is in the second leg. At least one post attachment aperture is proximate the distal end portion of the first leg and at least one post attachment aperture is proximate the distal end portion of the second leg. At least one pipe attachment member is configured and arranged to be inserted through the pipe attachment apertures to secure the bracket to a vertically extending member of a pipe gate. At least two post attachment members are configured and arranged to be inserted through the post attachment apertures to secure the bracket to a vertical post. A second pipe gate hinge is obtained. The second pipe gate hinge comprises a substantially U-shaped bracket, at least one pipe attachment member, and at least two post attachment members. The bracket has a first longitudinally extending leg with the distal end portion angled in the first transverse direction relative to the longitudinal axis and a second longitudinally extending leg with the distal end portion angled in the second transverse direction relative to the longitudinal axis. At least one pipe attachment aperture is in the first leg and one pipe attachment aperture is in the second leg. At least one post attachment aperture is proximate the distal end portion of the first leg and at least one post attachment aperture is proximate the distal end portion of the second leg. At least one pipe attachment member is configured and arranged to be inserted through the pipe attachment apertures to secure the bracket to a vertically extending member of a pipe gate. At least two post attachment members are configured and arranged to be inserted through the post attachment apertures to secure the bracket to a vertical post. The first pipe gate hinge is secured to a vertically extending end member of a pipe gate such that the hinge supports a horizontally extending member of the pipe gate. The second pipe gate hinge is secured to the vertically extending end member of the pipe gate a vertical distance from the first hinge. The first hinge is secured to a substantially vertical surface. The second hinge is secured to the same vertical surface a vertical distance from the first hinge.

BRIEF DESCRIPTION OF THE DRAWINGS

FIG. 4 is a front perspective view of the deflection insert in FIG. 3.

FIG. 5 is a front view of the bracket in FIG. 1 before bending into a U-shape.

DETAILED DESCRIPTION OF A PREFERRED EMBODIMENT

Nomenclature

| | |
|---|---|
| 10 | Hinge |
| 20 | Bracket |
| 21 | First leg |
| 21a | Distal end |
| 22 | Second leg |
| 22a | Distal end |
| 23 | Pipe attachment aperture |
| 24 | Post attachment aperture |

-continued

| | |
|---|---|
| 30 | Pipe attachment member |
| 40 | Post attachment member |
| 50 | Deflection insert |
| 51 | Crease |
| 100 | Pipe gate |
| 101 | Vertical member |
| 102 | Horizontal member |
| 110 | Fence post |
| $a_1$ | First angle |
| $a_2$ | Second angle |
| X | Longitudinal direction |
| $X_A$ | Longitudinal axis |
| Y | Lateral direction |
| $Z_1$ | First transverse direction |
| $Z_2$ | Second transverse direction |
| H | Horizontal |
| V | Vertical |
| $V_A$ | Vertical axis |

Construction

The hinge 10 may be used to hingedly attach a pipe gate 100 to a vertical surface such as, but not limited to, a building, a tree, or a fence post 110. Pipe gates 100 are commonly attached to fence posts. Therefore, the remainder of this discussion will be based upon a pipe gate 100 hingedly attached to a fence post 110.

Figure 1:
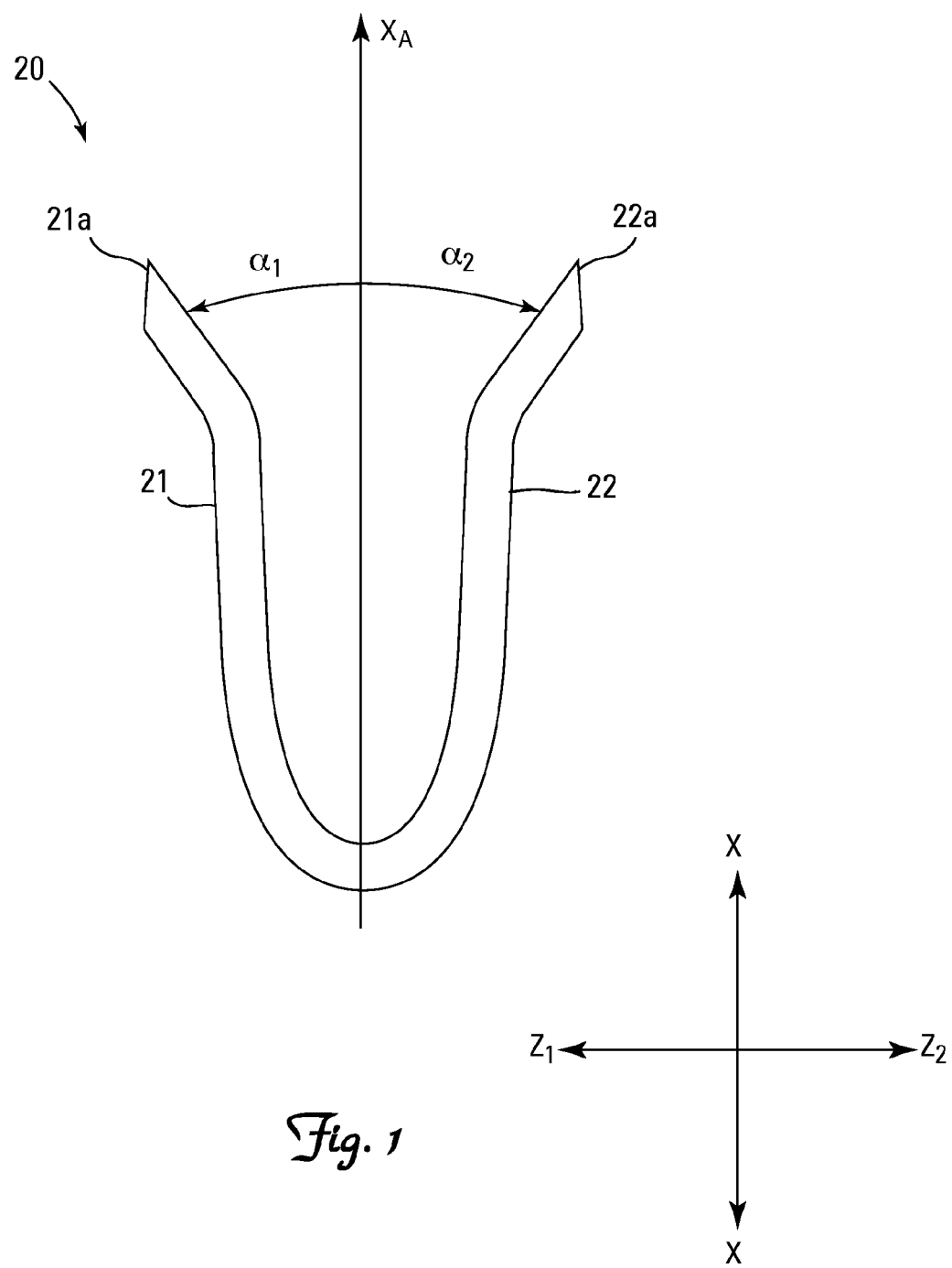
FIG. 1 is a top view of the bracket.
Figure 2:
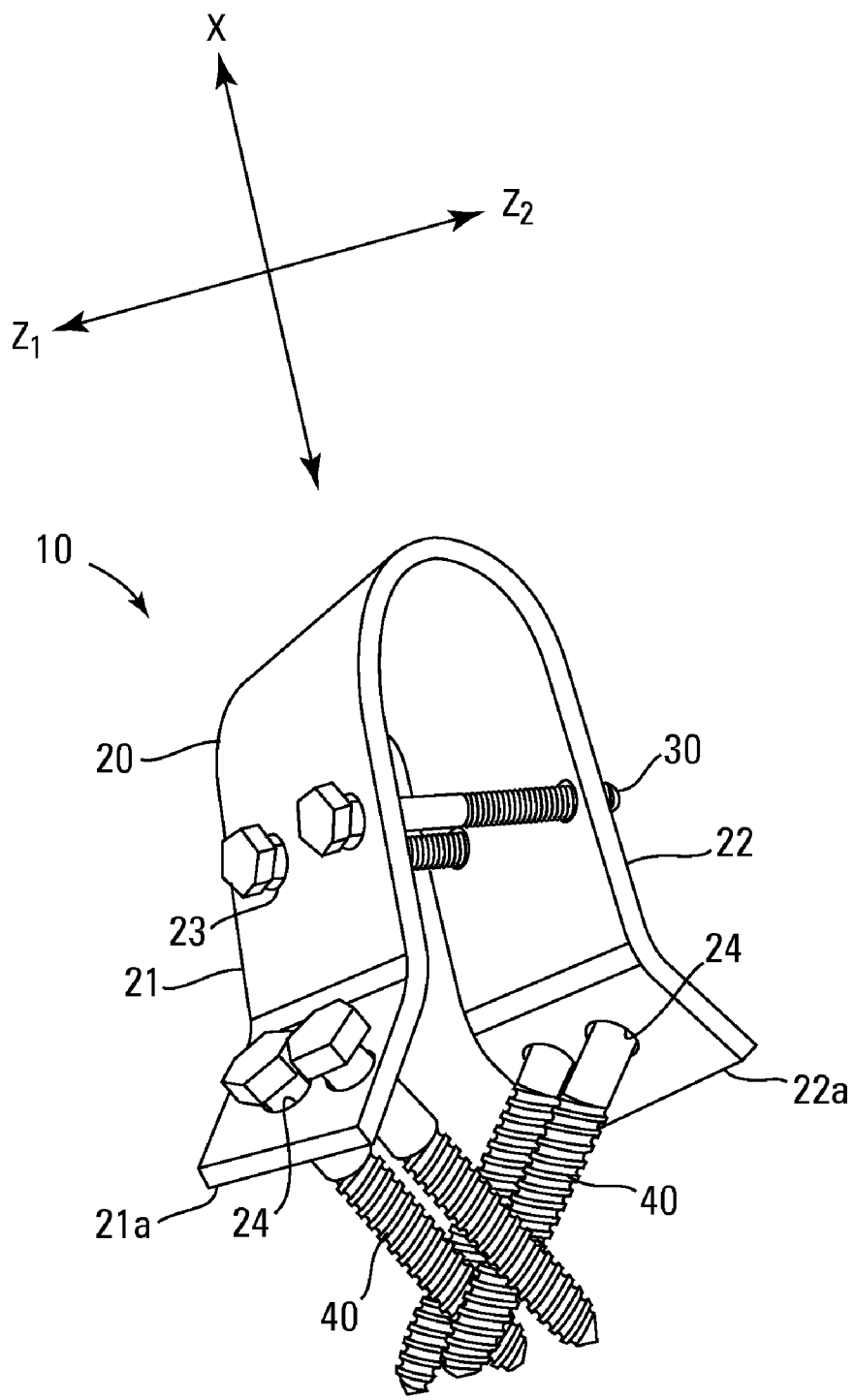
FIG. 2 is a top perspective view of the bracket in FIG. 1 with pipe attachment members and post attachment members.

As shown in FIGS. 1 and 2 one embodiment of the hinge 10 comprises a substantially U-shaped bracket 20, at least one pipe attachment member 30, and at least two post attachment members 40. The bracket 20 has a first longitudinally X extending leg 21 and a second longitudinally X extending leg 22. The first leg 21 has a distal end 21a portion angled in a first transverse direction $Z_1$ relative to the longitudinal axis $X_A$ and the second leg 22 has a distal end 22a portion angled in the second transverse direction $Z_2$ relative to the longitudinal axis $X_A$. Preferably the first distal end 21a portion has a first angle $\alpha_1$ less than 90° and the second distal end 22a portion has a second angle $\alpha_2$ less than 90°. Most preferably the first angle $\alpha_1$ is 45° in the first transverse direction $Z_1$ relative to the longitudinal axis $X_A$ and the second angle $\alpha_2$ is 45° in the second transverse direction $Z_2$ relative to the longitudinal axis $X_A$.

As shown in FIG. 5, the bracket 20 is preferably made from a unitary blank and then bent into the U-shape as shown in FIG. 1. The bracket 20 may be made from any suitable material such as metal or plastic. Most preferably the bracket 20 is made from 3/16 inch hot rolled flat bar steel.

As shown in FIGS. 1 and 5, the bracket 20 may have at least one pair of pipe attachment apertures 23 through the bracket 20. One pipe attachment aperture 23 through the first leg 21 and one pipe attachment aperture 23 through the second leg 21. Preferably the bracket 20 has two pair of pipe attachment apertures 23. As shown in FIG. 5, one pair of pipe attachment apertures 23 is in the first leg 21 and laterally Y spaced apart and the other pair of pipe attachment apertures 23 is in the second leg 22 and laterally Y spaced apart. The placement of the pipe attachment apertures 23 through the bracket 20 may be varied to accommodate the different sized pipe gates 100.

As shown in FIGS. 1 and 5, the bracket 20 may also have at least two post attachment apertures 24 through the bracket 20. Preferably the bracket 20 has four post attachment apertures 24. As shown in FIG. 5, one pair of post attachment apertures 24 is proximate the distal end 21a of the first leg 21 and laterally Y spaced apart. The other pair of post attachment apertures 24 is proximate the distal end 22a of the second leg 22 and also preferably laterally Y spaced apart. As shown in FIG. 2, the preferred placement of the post attachment apertures 24 in the first leg 21 are laterally Y offset from the post attachment apertures 24 in the second leg 22 so that when the post attachment members 40 are inserted through the post attachment apertures 24 and into the fence post 110, they do not intersect.

As shown in FIG. 2 the hinge 10 may also have at least one pipe attachment member 30 configured and arranged to be inserted through a pair of pipe attachment apertures 23. The pipe attachment member 30 may be any suitable attachment member that is long enough to be inserted through the pipe attachment apertures 23 in the first leg 21 and the second leg 22. The pipe attachment member 30 may be any suitable type of fastener such as a clip, a nut and bolt combination, a cotter pin, or heavy gauge wire. The most preferred pipe attachment member 30 is a bolt and nut combination.

Figure 3:
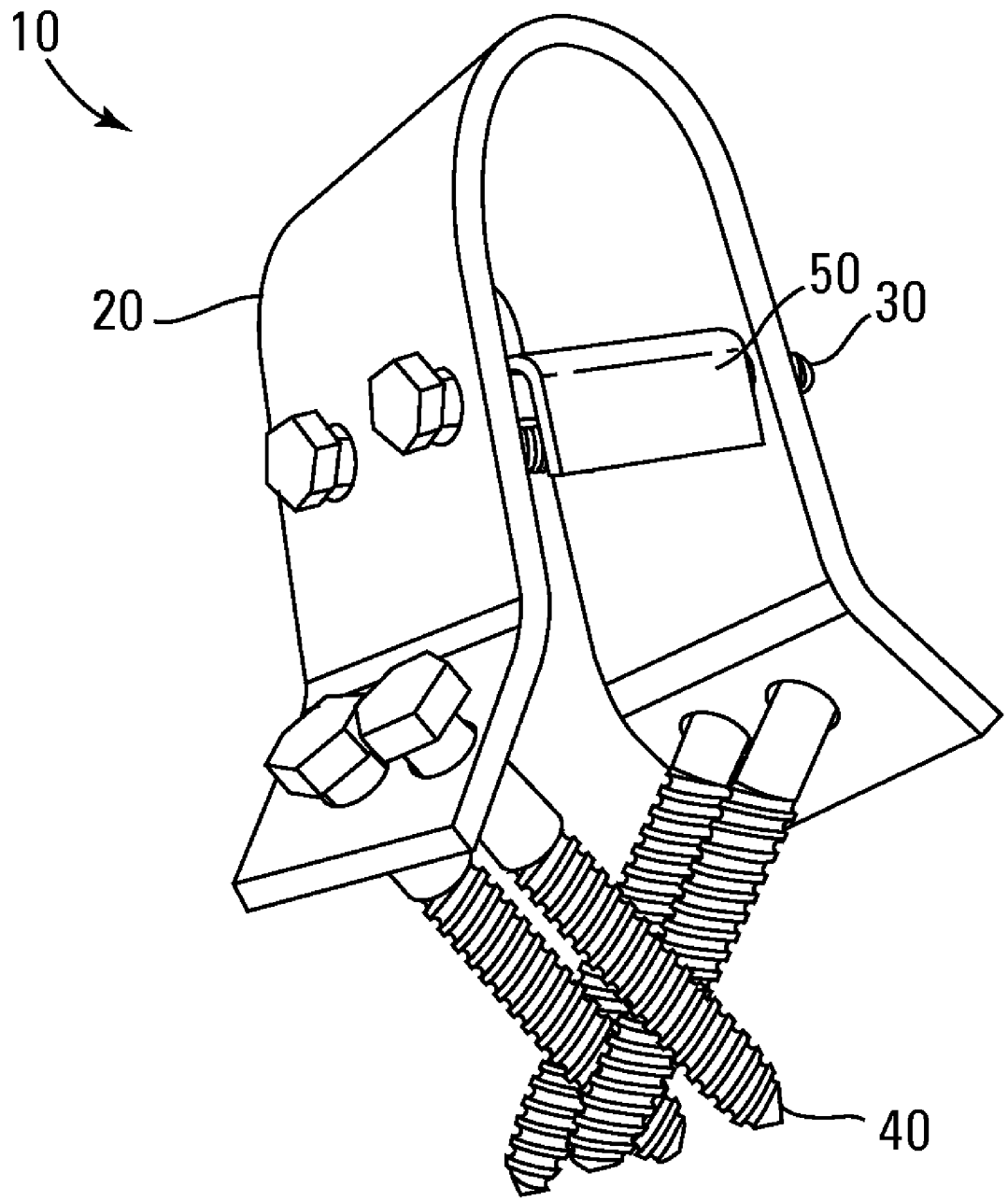
FIG. 3 is a top perspective view of the bracket in FIG. 2 with the deflection insert inserted into the bracket.

As shown in FIGS. 2 and 3 the hinge 10 may also have at least two post attachment members 40 configured and arranged to be inserted through the post attachment apertures 24 and into a vertical V fence post 110 to secure the bracket 20 to the vertical V fence post 110. The post attachment members 40 may be any suitable fasteners including nails, screws, bolts, and staples. The preferred post attachment member 40 is a lag screw.

Figure 12:
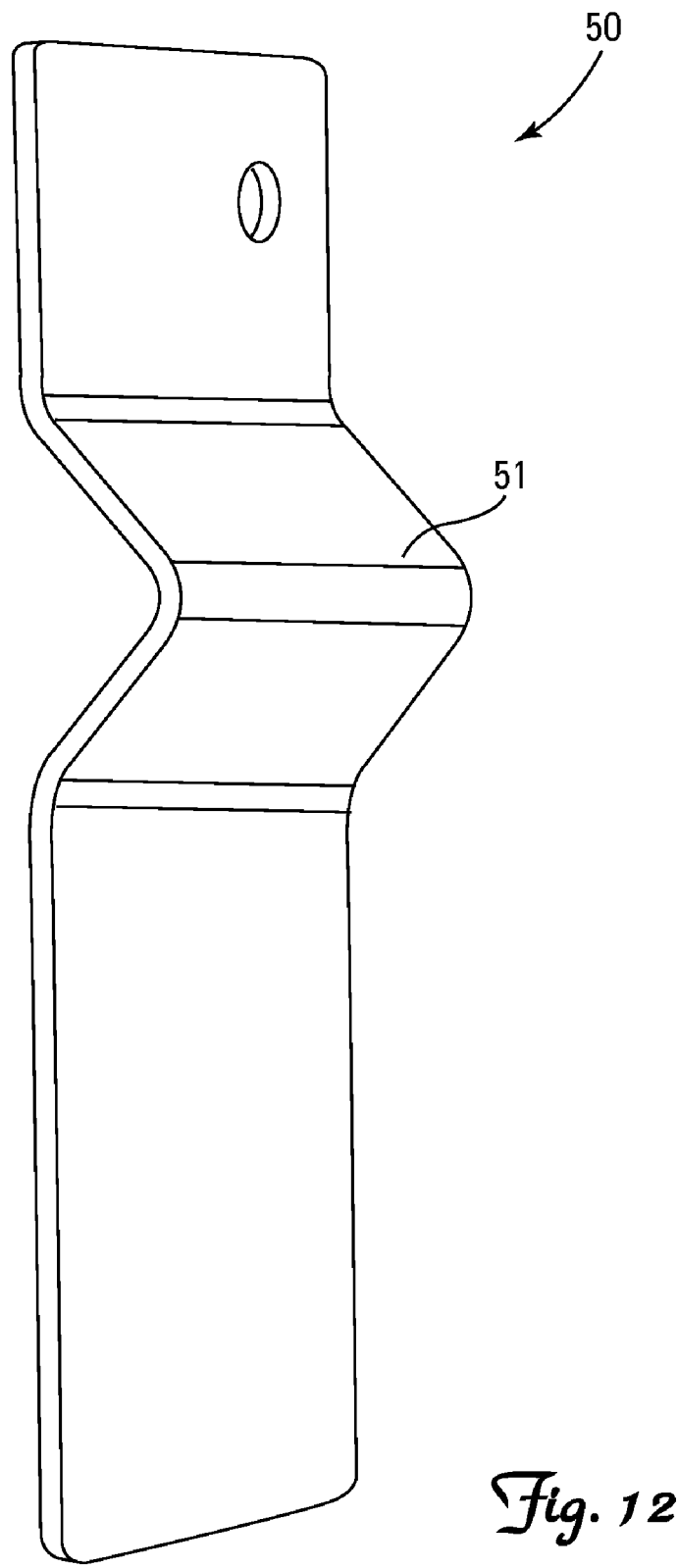
FIG. 12 is a side perspective view of a second embodiment of the deflection insert.

As shown in FIG. 3, the hinge 10 may also be used with a substantially flat deflection insert 50. The deflection insert 50 may be configured and arranged to be inserted into the U-shaped bracket 20 parallel to the pipe attachment member 30 and between the pipe attachment member 30 and a vertically V extending end member 101 of a pipe gate 100. Preferably the deflection insert 50 is then in contact with the vertical V end member 101 of the pipe gate 100 instead of the pipe attachment members 30 to help keep the end member 101 seated properly in the "U" of the bracket 20. As shown in FIG. 4 the deflection insert 50 may also have a lip (not numbered) on one end (not numbered) of the insert 50 to facilitate insertion into the U-shaped bracket 20 and to keep the insert 50 in position between the end member 101 and the pipe attachment member 30. As shown in FIG. 12 a second embodiment of the deflection insert 50 may have a crease 51 proximate one end of the insert wherein the crease 51 is in contact with the pipe attachment members 30 to prevent the deflection insert 50 from slipping off of the pipe attachment member 30. The deflection member may be made from any suitable material such as metal, plastic, or rubber. The preferred material is metal.

Use

Figure 6:
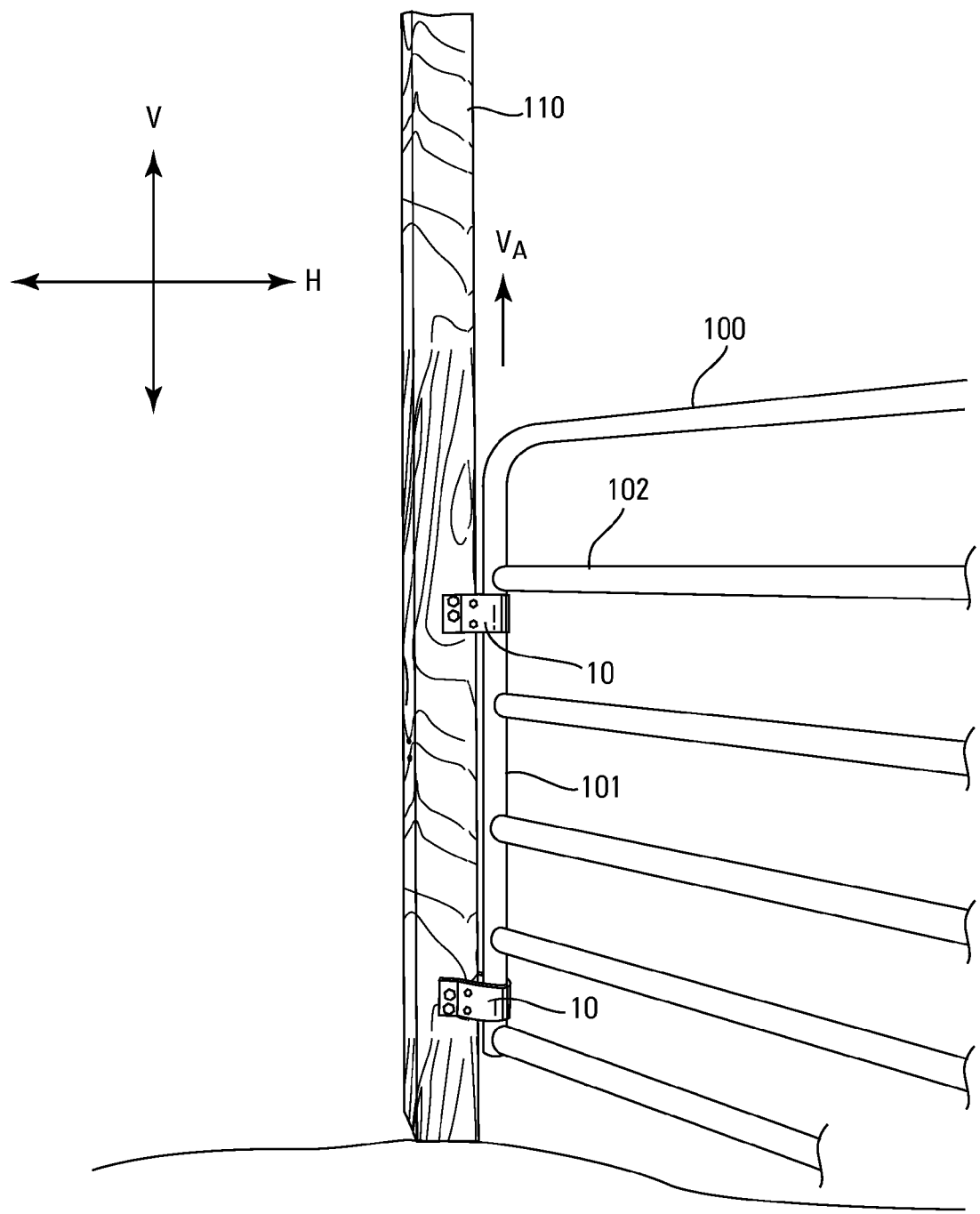
FIG. 6 is a partial side view of a pipe gate attached to a fence post with two brackets in FIG. 2.
Figure 7:
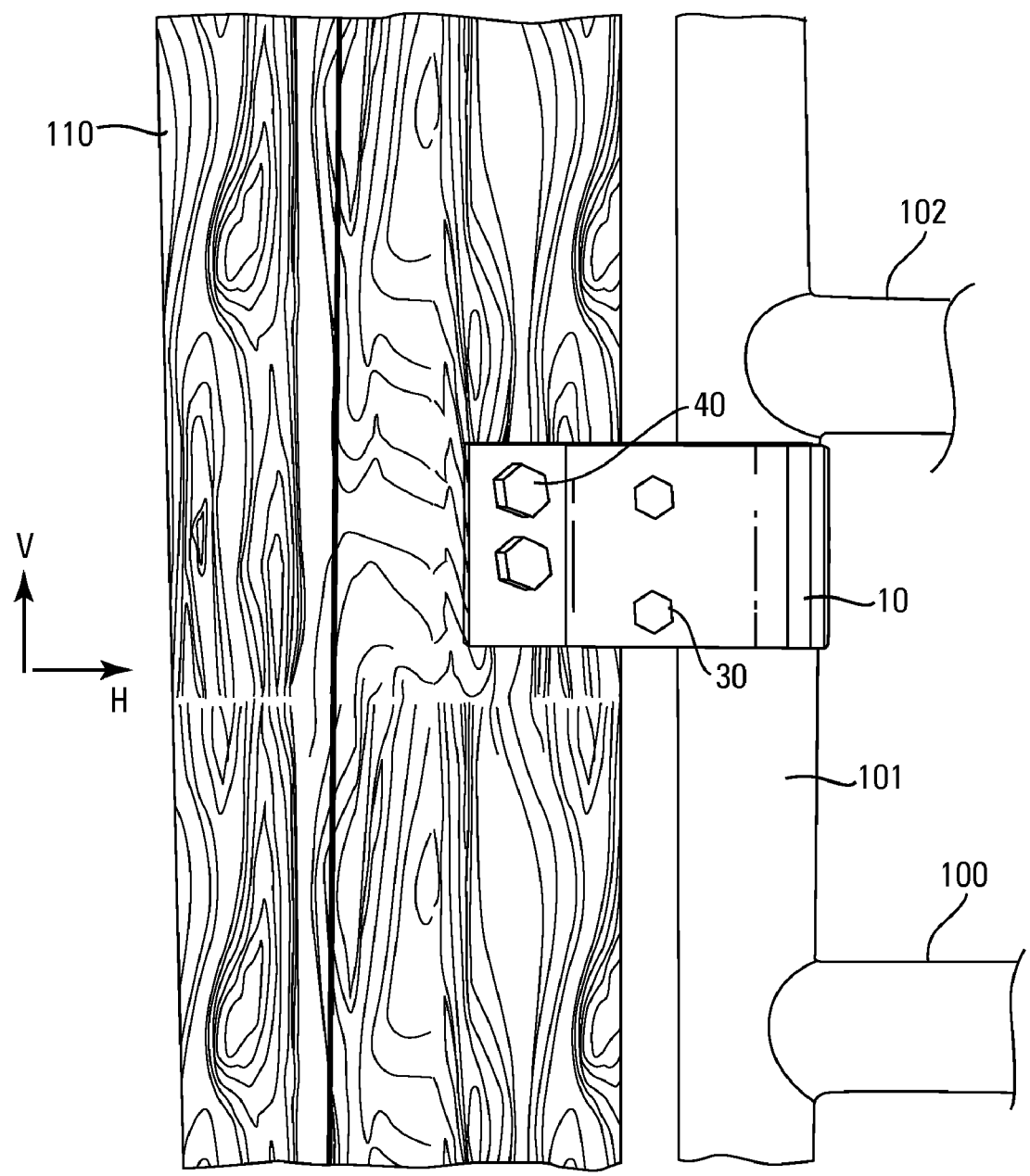
FIG. 7 is a close up side view of the bracket in FIG. 6 attached to a pipe gate and a vertical fence post where the bracket is supporting a horizontal member of the pipe gate.

The pipe gate 100 hinge 10 can be used to attach a pipe gate 100 to a substantially vertical V fence post 110. The vertical V end member 101 of a pipe gate 100 is inserted into the U-shaped bracket 20 of the first hinge 10. As shown in FIGS. 6 and 7, preferably the bracket 20 is positioned beneath a horizontal H member 102 of the pipe gate 100 to allow the horizontal H member 102 of the pipe gate 100 to rest upon the hinge 10. This may provide added structural support for the pipe gate 100 at the pivot point to help prevent sagging of the gate 100. A pipe attachment member 30 is then inserted through the pipe attachment aperture 23 in the first leg 21 and the second leg 22. The pipe attachment member 30 is then secured to the bracket 20. If a second set of pipe attachment apertures 23 are in the hinge 10, then another pipe attachment member 30 is inserted through the second set of pipe attachment apertures 23 and secured to the bracket 20. A second hinge 10 is attached to the vertical V member 101 of the pipe gate 100 a vertical V distance from the first hinge 10.

Figures 8, 9:
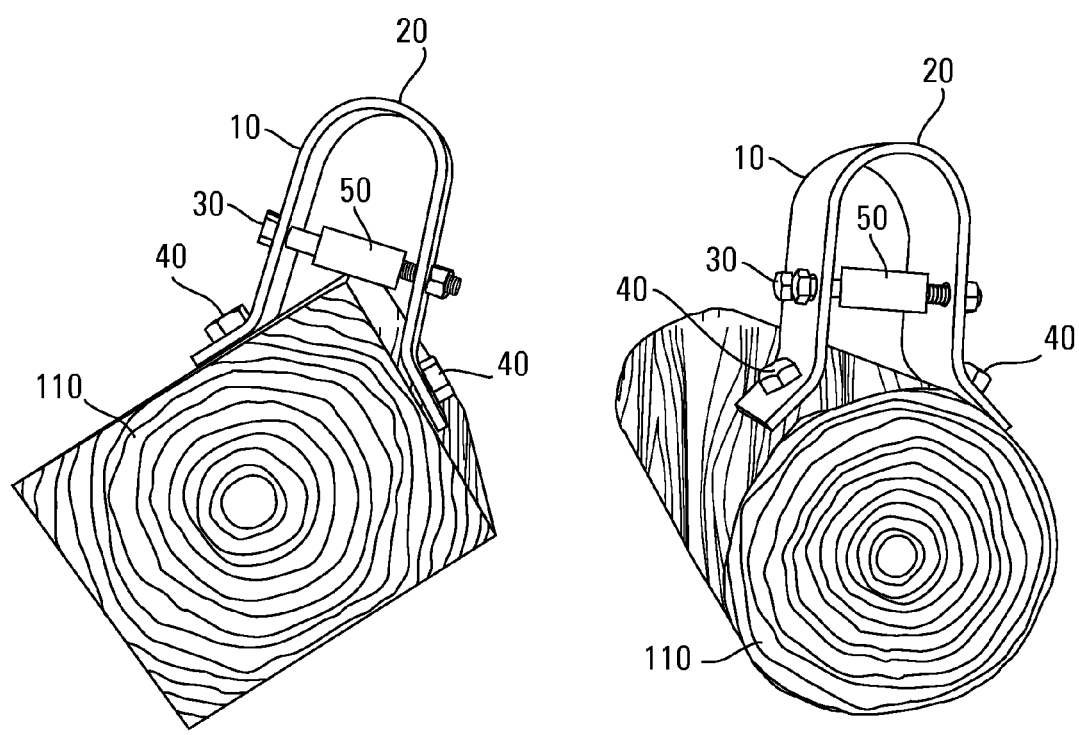
FIG. 8 is a top view of a square fence post with the bracket in FIG. 2 attached.
FIG. 9 is a top view of a round fence post with the bracket in FIG. 2 attached.

The first hinge 10 is then secured to a vertical V fence post 110. The first angle $\alpha_1$ of the distal end 21a portion of the first leg 21 and the second angle $\alpha_2$ of the distal end 22a portion of the second leg 22 may allow the hinge 10 to be attached to an angled or curved surface (not numbered) such as a fence post 110, the corner of a building, or even a tree. The fence post 110 may be a fence post 110 with a circular circumference (not numbered) as shown in FIG. 9 or a rectangular circumference as shown in FIG. 8.

The distal end 21a portion of the first leg 21 is placed next to the surface of the fence post 110 and the distal end 22a portion of the second leg 22 is placed next to the surface of the fence post 110 and then the post attachment members 40 are inserted through the post attachment apertures 24 so that the post attachment members 40 penetrate the fence post 110 to secure the hinge 10 to the fence post 110. If the surface of the fence post 110 where the hinge 10 is being attached is not of uniform thickness a shim (not numbered) may be placed between the surface of the fence post 110 and the distal end portion of the leg to allow the distal end portion to completely contact the surface of the fence post 110.

Figure 10:
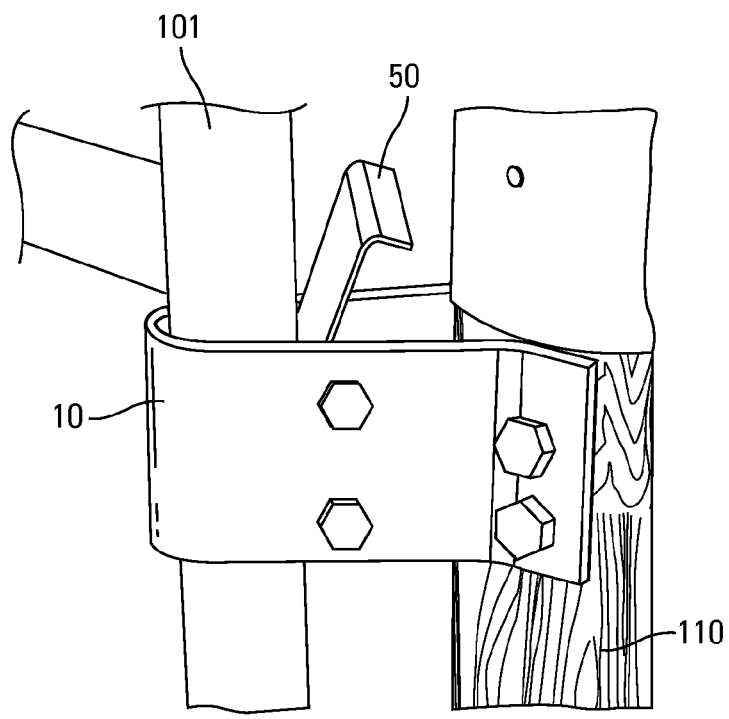
FIG. 10 is a front perspective view of the deflection insert in FIG. 4 prior to insertion into the bracket in FIG. 1 attached to a vertical fence post.
Figure 11:
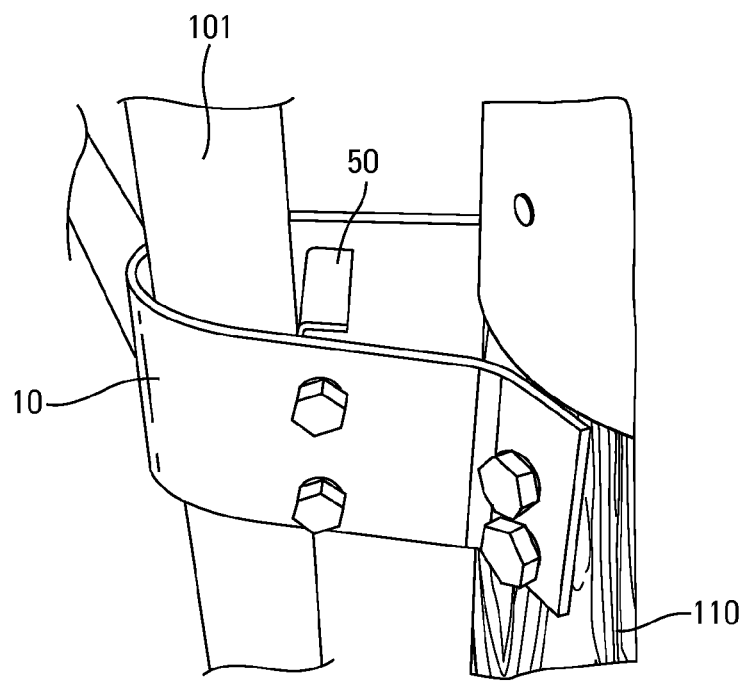
FIG. 11 is the deflection insert in FIG. 10 fully inserted into the bracket.

As shown in FIGS. 10 and 11, the deflection insert 50 may then be inserted between the vertical V member 101 of the pipe gate 100 and the pipe attachment members 30. Once fully inserted the deflection insert 50 may provide a greater surface area for the vertical V member to contact the hinge 10. Preferably the deflection insert 50 is used at least in the second hinge 10. Most preferable the deflection insert 50 is used in the first hinge 10 and the second hinge 10. The pipe gate 100 may now be rotated about a vertical axis $V_A$ wherein the vertical axis $V_A$ is the vertical V end member 101 of the pipe gate 100.

I claim:

1. A method of hingedly securing a pipe gate to a substantially vertical surface comprising the steps of:
    (a) obtaining a first pipe gate hinge comprising,
        (i) a substantially U-shaped bracket having,
            (A) a first longitudinally elongated leg,
            (B) a second longitudinally elongated leg,
            (C) at least two pipe attachment apertures wherein one pipe attachment aperture is through the first leg and one pipe attachment aperture is through the second leg, and
            (D) at least two post attachment apertures wherein one post attachment aperture is through the first leg proximate a distal end of the first leg and the other post attachment aperture is through the second leg proximate a distal end of the second leg,
            (E) wherein (1) the distal free end portion of the first leg is angled in a first transverse direction away from the second leg, and (2) the distal free end portion of the second leg is angled in a second transverse direction away from the first leg,
        (ii) at least one pipe attachment member configured and arranged to be inserted through the pipe attachment apertures to secure the bracket to a vertically extending member of a pipe gate, and
        (iii) at least two post attachment members configured and arranged to be inserted through the post attachment apertures to secure the bracket to a substantially vertical surface;
    (b) obtaining a second pipe gate hinge comprising
        (i) a substantially U-shaped bracket having,
            (A) a first longitudinally elongated leg,
            (B) a second longitudinally elongated leg,
            (C) at least two pipe attachment apertures wherein one pipe attachment aperture is through the first leg and one pipe attachment aperture is through the second leg, and
            (D) at least two post attachment apertures wherein one post attachment aperture is through the first leg proximate a distal end of the first leg and the other post attachment aperture is through the second leg proximate a distal end of the second leg,
            (E) wherein (1) the distal free end portion of the first leg is angled in a first transverse direction away from the second leg and (2) the distal free end portion of the second leg is angled in a second transverse direction away from the first leg,
        (ii) at least one pipe attachment member configured and arranged to be inserted through the pipe attachment apertures to secure the bracket to a vertically extending member of a pipe gate, and
        (iii) at least two post attachment members configured and arranged to be inserted through the post attachment apertures to secure the bracket to a substantially vertical surface;
    (c) securing the first pipe gate hinge to a vertically extending member of a pipe gate such that the hinge supports a horizontally extending member of the pipe gate;
    (d) securing the second pipe gate hinge to the vertically extending member of the pipe gate a vertical distance from the first hinge;
    (e) securing the first longitudinally elongated leg of the first hinge to a substantially vertical surface and securing the second longitudinally elongated leg of the first hinge to the substantially vertical surface; and
    (f) securing the first longitudinally elongated leg of the second hinge to the substantially vertical surface a vertical distance from the first hinge and securing the second longitudinally elongated leg of the second hinge to the substantially vertical surface.

2. The method, as recited in claim 1, further comprising the step of inserting a deflection insert into the second hinge.

3. The method, as recited in claim 1, wherein the distal end portion of the first longitudinal leg is angled less than 90° in the first transverse direction and the distal end portion of the second longitudinal leg is angled less than 90° in the second transverse direction.

4. The method, as recited in claim 1, wherein the distal end portion of the first longitudinal leg is angled 45° in the first transverse direction and the distal end portion of the second longitudinal leg is angled 45° in the second transverse direction.

5. The method, as recited in claim 1, wherein the substantially vertical surface is a fence post.

* * * * *